United States Patent
Zhao et al.

(10) Patent No.: US 12,099,203 B2
(45) Date of Patent: Sep. 24, 2024

(54) HEAD MOUNTED DISPLAY DEVICE AND HEAD MOUNTED DISPLAY ASSEMBLY

(71) Applicant: GOERTEK INC., Shandong (CN)

(72) Inventors: Zhongxu Zhao, Shandong (CN); Bin Jiang, Shandong (CN); Xiaoyu Chi, Shandong (CN)

(73) Assignee: GOERTEK INC., Shandong (CN)

( * ) Notice: Subject to any disclaimer, the term of this patent is extended or adjusted under 35 U.S.C. 154(b) by 10 days.

(21) Appl. No.: 17/999,675

(22) PCT Filed: Nov. 7, 2020

(86) PCT No.: PCT/CN2020/127360
§ 371 (c)(1),
(2) Date: Nov. 22, 2022

(87) PCT Pub. No.: WO2022/000920
PCT Pub. Date: Jan. 6, 2022

(65) Prior Publication Data
US 2023/0221567 A1    Jul. 13, 2023

(30) Foreign Application Priority Data

Jun. 29, 2020 (CN) .......................... 202010608362.4

(51) Int. Cl.
*G02B 27/01* (2006.01)
*H04R 1/10* (2006.01)

(52) U.S. Cl.
CPC ....... *G02B 27/0176* (2013.01); *H04R 1/1016* (2013.01); *G02B 2027/0169* (2013.01)

(58) Field of Classification Search
CPC .......... G02B 2/0176; G02B 2027/0169; H04R 1/1016
See application file for complete search history.

(56) References Cited

U.S. PATENT DOCUMENTS

2016/0202067 A1* 7/2016 Zhao .................... G02B 27/017
   701/428
2016/0202753 A1* 7/2016 Lee .......................... G02F 1/19
   345/8

(Continued)

FOREIGN PATENT DOCUMENTS

CN     106873183 A    6/2017
CN     207440395 U    6/2018
(Continued)

*Primary Examiner* — Sejoon Ahn
(74) *Attorney, Agent, or Firm* — LKGlobal | Lorenz & Kopf, LLP

(57) ABSTRACT

A head mounted display device and a head mounted display assembly are disclosed in some embodiments of the present disclosure. The head mounted display device comprises a display body and a sound transmission member. The display body is configured to display an image. The sound transmission member is connected to the display body, and is provided with a sound amplification cavity, a mounting groove communicated with the sound amplification cavity and a sound outlet hole. The mounting groove is configured to accommodate an earphone. The technical solution of the present disclosure can further reduce sound leakage and reduce noise interference to the surrounding environment.

17 Claims, 2 Drawing Sheets

(56) References Cited

U.S. PATENT DOCUMENTS

| | | | | |
|---|---|---|---|---|
| 2016/0205458 A1* | 7/2016 | Huang | ................ | H04R 1/1016 |
| | | | | 381/380 |
| 2016/0205461 A1* | 7/2016 | Fernandez-Medina | ...................... | |
| | | | | H01Q 7/00 |
| | | | | 381/74 |
| 2016/0210784 A1* | 7/2016 | Ramsby | ............. | G02B 27/0172 |
| 2016/0212889 A1* | 7/2016 | Nikkhoo | ............ | H05K 7/20963 |
| 2016/0316181 A1 | 10/2016 | Hamra | | |
| 2017/0024184 A1* | 1/2017 | Yuki | ....................... | G06F 3/165 |
| 2017/0026734 A1* | 1/2017 | Walker | .................... | H04R 1/44 |
| 2017/0026738 A1* | 1/2017 | Tang | ................... | H04R 1/1091 |
| 2018/0039086 A1 | 2/2018 | Jiang et al. | | |

FOREIGN PATENT DOCUMENTS

| | | |
|---|---|---|
| CN | 209693010 U | 11/2019 |
| CN | 210274477 U | 4/2020 |
| CN | 210573073 U | 5/2020 |
| CN | 111654777 A | 9/2020 |

* cited by examiner

HEAD MOUNTED DISPLAY DEVICE AND HEAD MOUNTED DISPLAY ASSEMBLY

CROSS-REFERENCE TO RELATED APPLICATIONS

This application is a U.S. National-Stage entry under 35 U.S.C. § 371 based on International Application No. PCT/CN2020/127360, filed Nov. 7, 2020 which was published under PCT Article 21(2) and which claims priority to Chinese Application No. 202010608362.4, filed Jun. 29, 2020, which are all hereby incorporated herein in their entirety by reference.

TECHNICAL FIELD

This application pertains to the technical field of near-eye display, in particular to a head mounted display device and a head mounted display assembly.

BACKGROUND

In AR (augmented reality) display or VR (virtual reality) display, sometimes it needs to transmit sound to human ears through a speaker, but this way of sound transmission is easy to cause sound leakage and generate noise to the surrounding environment. In addition, other objects, desirable features and characteristics will become apparent from the subsequent summary and detailed description, and the appended claims, taken in conjunction with the accompanying drawings and this background.

SUMMARY

In view of this, with respect to the problem in the prior art that during the use of the head mounted display device, it is easy to cause sound leakage and generate noise to the surrounding environment when the sound is transmitted to human ears by a speaker, it needs to provide a head mounted display device and a head mounted display assembly to reduce sound leakage and noise interference to the surrounding environment.

In order to achieve the above object, the present disclosure proposes a head mounted display device, the head mounted display device comprising:

a display body configured to display an image; and a sound transmission member connected to the display body, wherein the sound transmission member is provided with a sound amplification cavity, a mounting groove communicated with the sound amplification cavity, and a sound outlet hole, and the mounting groove is configured to accommodate an earphone.

Optionally, a groove wall of the mounting groove is provided with a sound transmission hole which communicates with the sound amplification cavity, and the sound transmission member comprises a seal provided in the sound transmission hole.

Optionally, the sound amplification cavity comprises a sound transmission section and a sound amplification section communicated with the sound transmission section, the sound transmission section communicates with the sound transmission hole, and the sound amplification section communicates with the sound outlet hole.

Optionally, the cross-sectional area of the sound amplification section gradually increases along a direction from the sound transmission section to the sound outlet hole.

Optionally, the sound transmission section comprises a sound output connection section and a sound amplification connection section, one end of the sound output connection section is connected to the sound transmission hole, two ends of the sound amplification connection section are connected respectively to the sound output connection section and the sound amplification section, and the sound amplification connection section extends in an arc shape.

Optionally, the sound transmission member comprises a rotating part rotatably connected to the display body.

Optionally, a side wall of the mounting groove is provided with a depression for connecting the earphone in snap fit.

In addition, in order to achieve the above object, the present disclosure also provides a head mounted display assembly, the head mounted display assembly comprises an earphone and the head mounted display device as described above, the earphone is provided with a first magnetic member, the mounting groove is provided with a second magnetic member, the earphone is mounted in the mounting groove, and the first magnetic member and the second magnetic member attract each other.

Optionally, a charging probe is provided in the mounting groove, the earphone is provided with a conductive sheet corresponding to the charging probe, when the earphone is placed in the mounting groove, the conductive sheet abuts against the charging probe, and the head mounted display device charges the earphone.

Optionally, there are two sound transmission members provided respectively at opposite ends of an outer side of the display body, and the earphone comprise a wireless connection module configured to be connected to the display body.

In the technical solution proposed in the present disclosure, the earphone is disposed in the mounting groove of the sound transmission member, and the volume of the sound emitted by the earphone increases after passing through the sound amplification cavity, so as to ensure that the sound heard by the user is clearer. At the same time, the sound is transmitted along the sound amplification cavity and played out through the sound outlet hole. It can be understood that the sound amplification cavity can be used to transmit sound directionally, and it can be used to transmit sound directionally to desired direction and position. For example, the sound is directionally transmitted to the human ear through the sound amplification cavity. The directional transmission of sound can reduce spreading around of sound, and thus reduce sound leakage; moreover, it can reduce noise interference to the surrounding environment.

BRIEF DESCRIPTION OF DRAWINGS

The present invention will hereinafter be described in conjunction with the following drawing figures, wherein like numerals denote like elements, and.

DETAILED DESCRIPTION

Figure 1:
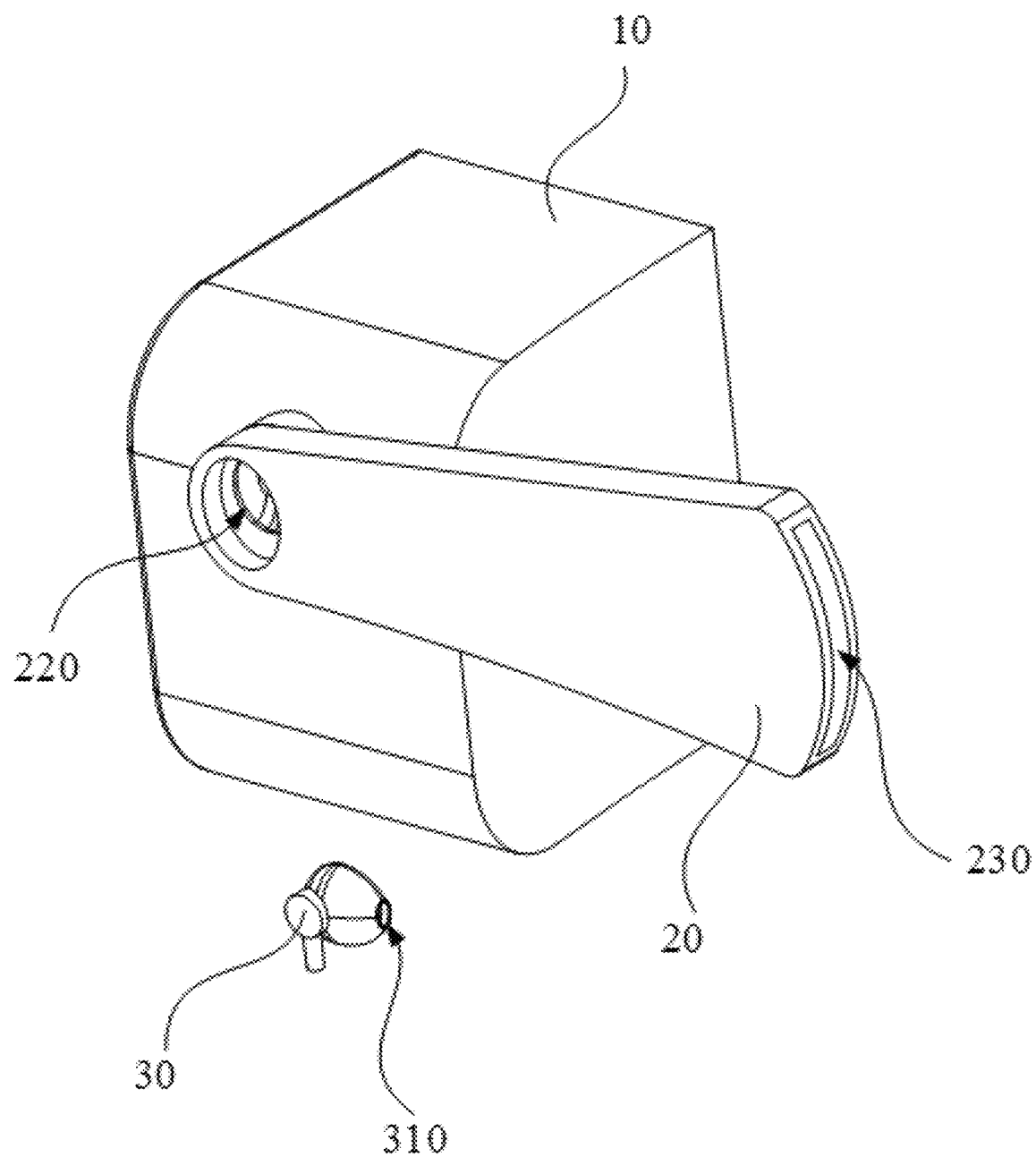
FIG. 1 is a schematic view of the structure of a head mounted display device according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

It should be noted that all directional indications (such as up, down, left, right, front, back, etc.) in the embodiments of the present disclosure are only used to explain the relative positional relationship, the movement situation, etc. among various components under a certain posture (as shown in the accompanying drawings). If the specific posture changes, the directional indication will also change accordingly.

In addition, in the present disclosure, the terms "first" and "second" are used for descriptive purposes only and are not to be construed as indicating or implying relative importance or implicitly indicating the number of indicated technical features. Thus, a feature with "first" or "second" may explicitly or implicitly include at least one such a feature. In the description of the present disclosure, "a plurality of" means at least two, such as two, three, etc., unless expressly defined otherwise.

In the present disclosure, unless otherwise expressly specified and defined, the terms "connected", "fixed" and the like should be understood in a broad sense, for example, it may be fixedly connected, or removably connected, or integrally connected; it may also be mechanically connected or electrically connected; it may also be directly connected or indirectly connected through a middleware; it may also be internally communicated or interacted between two components. For a person of ordinary skill in the art, the specific meaning of these terms in the present disclosure should be understood according to specific situations.

In addition, the technical solutions in various embodiments of the present disclosure can be combined with each other if their combination is realizable to a person of ordinary skill in the art. When the combination of technical solutions is contradictory or cannot be realized, it should be considered that such a combination of technical solutions does not exist and is not within the scope of protection claimed in the present disclosure.

The head mounted display device is a display device using AR display technology or VR display technology. It is usually worn on the user's head to display images near the human eye, and provides the user immersive image experience. When the user is in the immersive experience, it is a private environment. However, sometimes the sound emitted by the head mounted display device is easy to spread around, resulting in sound leakage. At the same time, it also affects the surrounding environment and brings noise to the surrounding environment.

Thus, the present disclosure provides a head mounted display device.

Figure 2:
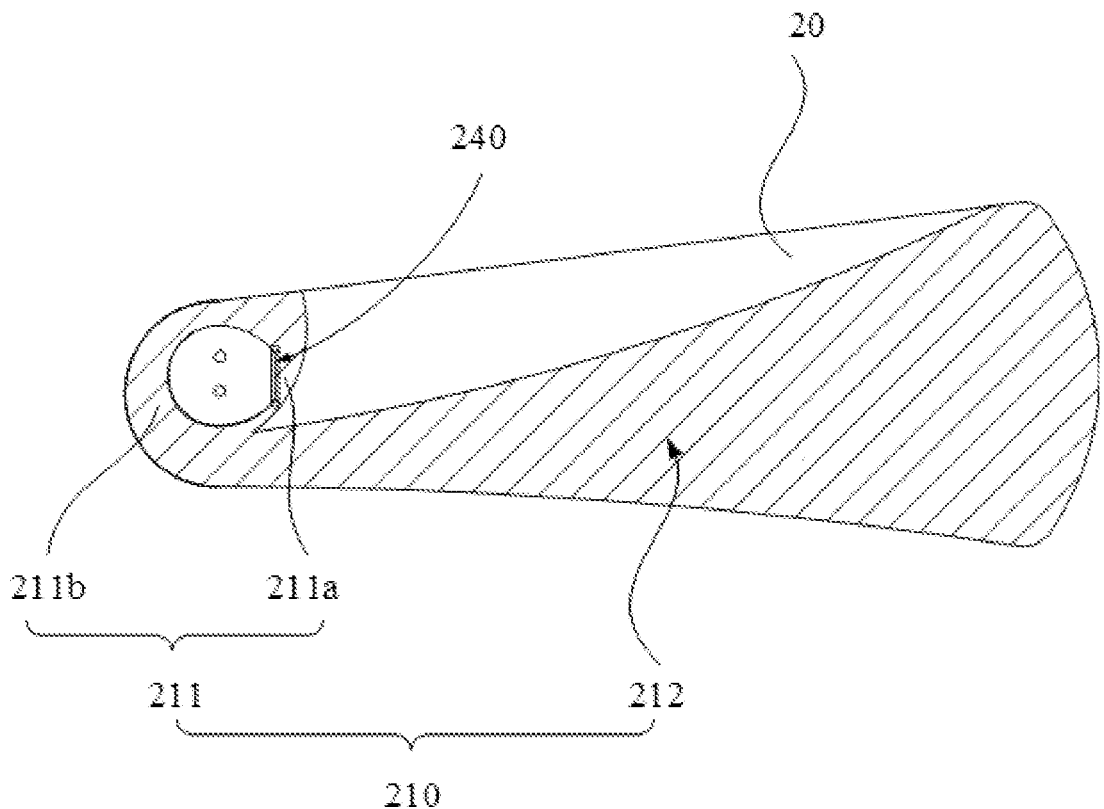
FIG. 2 is a sectional view of a sound transmission member in FIG. 1.

As shown in FIG. 1 and FIG. 2, the head mounted display device comprises a display body 10 and a sound transmission member 20, and the sound transmission member 20 is provided on the display body 10.

The display body 10 is configured to display an image. Specifically, the display body 10 comprises a display screen and a casing. The display screen is disposed in the casing, and the casing protects the display screen by partly enclosing it. The display body 10 also comprises a main circuit board and various optical components disposed in the casing, and displays the image via a display screen. The display body 10 also comprises a head mounted member configured to fix the head mounted display device on the user's head when the user wears the head mounted display device. For example, the head mounted member comprises a fastening strap, and the display body 10 is fixed on the user's head via the fastening strap.

The sound transmission member 20 is connected to the display body 10. The sound transmission member 20 is provided with a sound amplification cavity 210, a mounting groove 220 communicated with the sound amplification cavity 210, and a sound outlet hole 230. The mounting groove 220 is configured to accommodate an earphone 30. The sound transmission member 20 may be connected to the display body 10 by rotary connection or fixed connection. The earphone 30 is placed in the mounting groove 220. Since the sound emitted by the earphone 30 is small, in order to enable the user to hear a sound clearly, an sound amplification cavity 210 is adopted to amplify the sound so that it can be ensured that the user can obtain a sound with sufficient volume. The amplified sound is transmitted outward through the sound outlet hole 230, and the sound can be effectively played out along a specified direction by means of the directional transmission of the sound amplification cavity 210. The direction of the sound outputted from the sound outlet hole 230 may face towards the human ear 40 so as to ensure that the user can obtain the sound.

In addition, it should be noted that the earphone 30 is placed in the mounting groove 220 to play sound. In this way, the user does not need to wear the earphone 30 in the ear, thereby reducing the damage to the ear caused by wearing the earphone 30 for a long time. Moreover, the earphone 30 can also be taken out and directly worn in the user's ear, so as to ensure that the user can obtain the sound with a better quality.

In addition, in order to ensure the shape of the sound amplification cavity 210, the sound transmission member 20 is made of a hard material. For the ease of processing, usually the sound transmission member 20 and the casing of the display body 10 are made of the same material, such as PVC (polyvinyl chloride) material.

In the technical solution according to this embodiment, the earphone 30 is disposed in the mounting groove 220 of the sound transmission member 20, and the volume of the sound emitted by the earphone 30 increases after passing through the sound amplification cavity 210, thereby ensuring that the sound heard by the user is clearer. At the same time, the sound is transmitted along the sound amplification cavity 210 and played out via the sound outlet hole 230. It can be understood that the sound amplification cavity 210 can be used to transmit sound directionally, and it can be used to transmit sound directionally to desired direction and position. For example, the sound is directionally transmitted to a human ear 40 via the sound amplification cavity 210. The directional transmission of sound can reduce sound spreading around, and thus reduce sound leakage; moreover, it can reduce noise interference to the surrounding environment.

In the above embodiment, in order to ensure that the sound loss in the transmission process can be reduced, the groove wall of the mounting groove 220 is provided with a sound transmission hole (not shown), and the sound transmission hole communicates with the sound amplification cavity 210. The sound transmission member 20 comprises a seal 240, and the seal 240 is provided in the sound transmission hole. The earphone 30 has a sound output end 310. When the earphone 30 is placed in the mounting groove 220, the sound output end 310 of the earphone 30 is placed facing the sound transmission hole, and a gap is formed between the sound output end 310 of the earphone 30 and the sound transmission hole. Thus, the sound is easy to leak out from the gap, which will result in the loss of sound in the transmission process, and will also affect the surrounding environment. The seal 240 is provided at a side of the sound transmission hole that faces the sound output end 310 of the earphone 30, that is, the seal 240 is disposed between the sound output end 310 and the sound transmission hole of the earphone 30. The seal 240 can seal the gap between the sound output end 310 and the sound transmission hole, thereby reducing the sound loss in the transmission process. The seal 240 comprises a rubber ring which is adhered to the inner wall of the mounting groove 220 around the sound transmission hole. Alternatively, a groove may be provided on the inner wall of the mounting groove 220 which is provided around the sound transmission hole, and the rubber ring is embedded in the groove.

In the above embodiment, the sound amplification cavity 210 comprises a sound transmission section 211 and a sound amplification section 212 communicated with the sound transmission section 211, the sound transmission section 211 communicates with the sound transmission hole, and the sound amplification section 212 communicates with the sound outlet hole 230. By providing the sound transmission section 211 and the sound amplification section 212, the length of the sound amplification cavity 210 can be increased, so that the sound can have a sufficient propagation distance in the process of propagation, and thus it can be ensured that the sound emitted by the earphone 30 is sufficiently clear when transmitted to the human ear 40.

In the above embodiment, in order to ensure that the sound emitted by the earphone 30 can be clearer, the area of the sound output end 310 of the earphone 30 may be increased, or the cross-sectional area of the sound amplification cavity 210 may be increased. The area of the sound output end 310 of the earphone 30 is usually fixed. Therefore, the cross-sectional area of the sound amplification section 212 gradually increases along a direction from the sound transmission section 211 to the sound outlet hole 230. Thus, a gradually expanding sound transmission channel is formed, and the sound is transmitted in this sound transmission channel to improve the transmission efficiency of the sound and thus improve the level of sound pressure to make it louder, so as to make the sound heard by the user clearer.

Further, in order to ensure the sound transmission effect, the cross-sectional area of the sound transmission section 211 gradually increases along a direction from the sound transmission hole to the sound amplification section 212. On the basis of the gradual increase of the cross-sectional area of the sound amplification section 212, the cross-sectional area of the sound transmission section 211 also gradually increases. It can be understood that the overall cross-sectional area of the sound amplification cavity 210 gradually increases along a direction from the sound transmission hole to the sound outlet hole 230. According to the sound wave propagation principle, the sound volume is increased along the sound amplification cavity 210, so that the user can receive a clearer sound.

In the above embodiment, the sound transmission section 211 comprises a sound output connection section 211a and a sound amplification connection section 211b, one end of the sound output connection section 211a is connected to the sound transmission hole, two ends of the sound amplification connection section 211b are respectively connected to the sound output connection section 211a and the sound amplification section 212, and the sound amplification connection section 211b extends in an arc shape.

It can be seen that the sound emitted by the earphone 30 passes through the sound transmission hole, the sound output connection section 211a, the sound amplification connection section 211b and the sound amplification section 212 in sequence. Among them, the sound amplification connection section 211b extends in an arc shape, and the extension direction of the sound amplification connection section 211b extends around the outer wall of the mounting groove 220. In this way, the extension length of the sound amplification cavity 210 can be increased, and then the sound propagation distance can be increased, so that the sound can be greatly increased to ensure that the sound received by the user is clearer.

Specifically, the sound amplification section 212 extends from one side of the mounting groove 220 in the up and down direction, and the sound output connection section 211a extends around the mounting groove 220 and extends away from the sound amplification section 212, that is, the sound output connection section 211a also extends in an arc shape. The arc angle of the sound output connection section 211a ranges from 0° to 90°; the arc angle of the sound amplification connection section 211b ranges from 0° to 270°.

In addition, such a design in which the sound output connection section 211a and the sound amplification connection section 211b are provided around the mounting groove 220 can reduce the overall length of the sound transmission member 20, that is, the sound amplification connection section 211b mostly extends at the position of the display body 10, thereby avoiding the overcrowding of the whole head mounted display device while ensuring a sufficient propagation distance of sound. Since the sound outlet hole 230 of the sound transmission member 20 faces towards the human ear 40, this design can also prevent the sound transmission member 20 from being too long, which will result in the position of the sound outlet hole 230 going beyond the human ear 40 and being behind the user's head.

In the above embodiment, the sound transmission member 20 comprises a rotating part (not shown in figures), which is rotatably connected to the display body 10. When the user does not need to use the microphone 20, the user can rotate and retract the sound transmission member 20. After the sound transmission member 20 is rotated and retracted, the sound transmission member 20 can be located at two ends of the display body 10 to prevent the sound transmission member 20 from protruding out of the outer side of display body 10, which may be also convenient for the user to wear the head mounted display device. Specifically, the rotating part may be provided at an end of the sound transmission member 20 that is away from the sound outlet hole 230. In addition, the rotating part may also be provided in the middle of the sound transmission member 20, which can further save the space occupied by the sound transmission member 20.

Further, the rotating part can rotate 360° around the display body 10, so that the propagation direction of the sound hole 230 can be adjusted to ensure that the user can receive the sound played by the earphone 30 at a more comfortable angle.

In the above embodiment, in order to effectively fix the earphone 30 in the mounting groove 220, a depression for connecting the earphone 30 in snap fit is provided on a side wall of the mounting groove 220. Specifically, the sound output end 310 of the earphone 30 is usually protruded, and by connecting the sound output end 310 and the depression in snap fit, the earphone 30 can be effectively fixed in the mounting groove 220 so as to prevent the earphone 30 from falling off.

Figure 3:
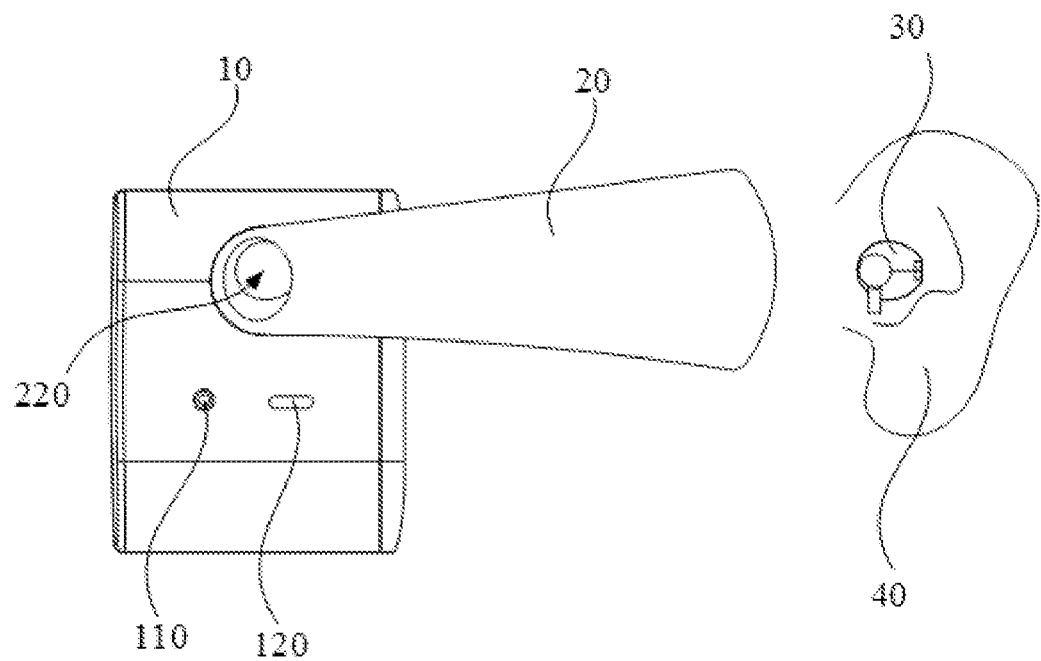
FIG. 3 is a schematic view of the structure of a head mounted display device when an earphone is worn in a human ear according to an embodiment of the present disclosure.

As shown in FIG. 3, the present disclosure also provides a head mounted display assembly, which comprises an earphone 30 and a head mounted display device as described above. The earphone 30 is provided with a first magnetic member, the mounting groove 220 is provided with a second magnetic member, the earphone 30 is mounted in the mounting groove 220, and the first magnetic member and the second magnetic member attract each other.

The embodiments of the head mounted display assembly may refer to the above specific embodiments of the head mounted display device, which will not be repeated here.

At least one of the first magnetic member and the second magnetic member is a magnet, and the other may be a magnet or a magnetic metal sheet, such as an iron sheet. In addition, the first magnetic member is provided inside the earphone 30, and the second magnetic member is provided inside the sound transmission member 20, thereby avoiding the exposure of the first magnetic member and the second magnetic member, making the earphone 30 and the head mounted display device as a whole neat and tidy, and also avoiding the corrosion of the first magnetic member and the second magnetic member due to exposure.

In the above embodiment, the mounting groove 220 is provided therein with a charging probe, and the earphone 30 is provided with a conductive sheet corresponding to the charging probe. When the earphone 30 is placed in the mounting groove 220, the conductive sheet abuts against the charging probe, and the head mounted display device charges the earphone 30. It is understandable that the earphone 30 may also play sound via the sound transmission member 20 when it is being charged. Thus, the user's continued use of the head mounted display device will not be affected by the lack of electricity in the earphone 30. In addition, the sound of the displayed image in the display body 10 can be transmitted to the earphone 30 via the charging probe. A signal probe may also be provided between the display body 10 and the earphone 30 to transmit sound to the earphone 30 via the signal probe.

In the above embodiment, there are two sound transmission members 20, and the two sound transmission members 20 are respectively disposed at two opposite ends of the outer side of the display body 10. The earphone 30 comprises a wireless connection module configured to be connected to the display body 10. The earphone 30 is taken out from the mounting groove 220, and is connected to the display body 10 through the wireless connection module. The sound can be obtained in the left and right ears of the user via the two sound transmission members 20. The wireless connection module comprises a Bluetooth module. For example, a Bluetooth sending module is provided in the earphone 30, a Bluetooth receiving module is provided in the display body 10, and the earphone 30 and the display body 10 establish the Bluetooth connection. Users can get a better immersive experience when wearing the earphone 30 directly. It can be seen from the above embodiments that there are two ways for the user to receive the sound played by the earphone 30. One is that the earphone 30 is mounted in the mounting groove 220, and the other is that the user directly wears the earphone 30. Users can choose a comfortable way to enjoy the immersive experience according to the surrounding environment of the site.

In addition, there are two earphones. The user can choose to place one earphone in the mounting groove and the other earphone in the ear. Moreover, when the earphone is placed in the mounting groove, it may also be wirelessly connected to the display body 10 via the wireless connection module.

It should also be noted that the display body 10 is provided with a first audio port 110 and a second audio port 120, the first audio port 110 is a type-C port, and the second audio port 120 is a 3.5 mm coaxial audio port. In other words, the display body 10 may also be additionally connected to an external audio playback device.

The embodiments in this specification are described in a parallel or progressive manner. Each embodiment focuses on the differences from other embodiments. The same or similar parts of each embodiment may be referred by each other. As for the device disclosed in the embodiments, since they correspond to the method disclosed in the embodiments, their description is relatively simple, and relevant parts may refer to the description of the method part.

Those skilled in the art will also understand that the units and algorithm steps of the examples described in conjunction with the embodiments disclosed herein can be implemented in electronic hardware, computer software or a combination thereof. In order to clearly illustrate the interchangeability of hardware and software, the composition and steps of the examples have been generally described in the above description according to functions. Whether these functions are implemented in hardware or software depends on the specific application and design constraints of the technical solution. Those skilled in the art may use different methods to realize the described functions for each specific application, but such realization shall not be considered beyond the scope of the present disclosure.

The steps of a method or algorithm described in conjunction with the embodiments disclosed herein may be directly implemented by hardware, by software module executed by a processor, or by a combination of hardware and software. The software module may be placed in a random access memory (RAM), an internal memory, a read only memory (ROM), an electrically programmable ROM, an electrically erasable programmable ROM, a register, a hard disk, a removable disk, a CD-ROM, or any other form of storage medium known in the art.

It should also be noted that, relational terms such as first and second used herein are only to distinguish one entity or operation from another, and do not necessarily require or imply that there is such actual relationship or order among those entities or operations. Moreover, the terms "comprise", "include" or any other variants are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase "comprising a . . . " does not exclude the case that there are other same elements in the process, method, article or apparatus including the element.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A head mounted display device, comprising:
    a display body configured to display an image; and
    a sound transmission member connected to the display body, wherein the sound transmission member is provided with a sound amplification cavity, a mounting groove communicated with the sound amplification cavity, and a sound outlet hole, and the mounting groove is configured to accommodate an earphone, sound emitted by the earphone is transmitted outward through the sound outlet hole after amplified by the sound amplification cavity,
    a groove wall of the mounting groove is provided with a sound transmission hole which communicates with the sound amplification cavity,
    the sound amplification cavity comprises a sound transmission section and a sound amplification section communicated with the sound transmission section, the sound transmission section communicates with the sound transmission hole, and the sound amplification section communicates with the sound outlet hole,
    wherein a cross-sectional area of the sound amplification section gradually increases along a direction from the sound transmission section to the sound outlet hole.

2. The head mounted display device according to claim 1, wherein the sound transmission member comprises a seal provided in the sound transmission hole.

3. The head mounted display device as claimed in claim 2, wherein the sound transmission section comprises a sound output connection section and a sound amplification connection section, one end of the sound output connection section is connected to the sound transmission hole, two ends of the sound amplification connection section are respectively connected to the sound output connection section and the sound amplification section, and the sound amplification connection section extends in an arc shape.

4. The head mounted display device according to claim 1, wherein the sound transmission member comprises a rotating part rotatably connected to the display body.

5. The head mounted display device according to claim 1, wherein a side wall of the mounting groove is provided with a depression for connecting the earphone in snap fit.

6. A head mounted display assembly, comprising an earphone and a head mounted display device,
    the head mounted display device comprises:
    a display body configured to display an image; and
    a sound transmission member connected to the display body, wherein the sound transmission member is provided with a sound amplification cavity, a mounting groove communicated with the sound amplification cavity, and a sound outlet hole, and the mounting groove is configured to accommodate the earphone, sound emitted by the earphone is transmitted outward through the sound outlet hole after amplified by the sound amplification cavity,
    a groove wall of the mounting groove is provided with a sound transmission hole which communicates with the sound amplification cavity,
    the sound amplification cavity comprises a sound transmission section and a sound amplification section communicated with the sound transmission section, the sound transmission section communicates with the sound transmission hole, and the sound amplification section communicates with the sound outlet hole,
    wherein a cross-sectional area of the sound amplification section gradually increases along a direction from the sound transmission section to the sound outlet hole,
    the earphone is provided with a first magnetic member, the mounting groove is provided therein with a second magnetic member, the earphone is mounted in the mounting groove, and the first magnetic member and the second magnetic member attract each other.

7. The head mounted display assembly according to claim 6, wherein a charging probe is provided in the mounting groove, the earphone is provided with a conductive sheet corresponding to the charging probe, when the earphone is placed in the mounting groove, the conductive sheet abuts against the charging probe, and the head mounted display device charges the earphone.

8. The head mounted display assembly according to claim 6, wherein there are two sound transmission members provided respectively at two opposite ends of an outer side of the display body, and the earphone comprise a wireless connection module configured to be connected to the display body.

9. The head mounted display device according to claim 2, wherein the sound transmission member comprises a rotating part rotatably connected to the display body.

10. The head mounted display device according to claim 1, wherein the sound transmission member comprises a rotating part rotatably connected to the display body.

11. The head mounted display device according to claim 1, wherein the sound transmission member comprises a rotating part rotatably connected to the display body.

12. The head mounted display device according to claim 3, wherein the sound transmission member comprises a rotating part rotatably connected to the display body.

13. The head mounted display device according to claim 2, wherein a side wall of the mounting groove is provided with a depression for connecting the earphone in snap fit.

14. The head mounted display device according to claim 1, wherein a side wall of the mounting groove is provided with a depression for connecting the earphone in snap fit.

15. The head mounted display device according to claim 1, wherein a side wall of the mounting groove is provided with a depression for connecting the earphone in snap fit.

16. The head mounted display device according to claim 3, wherein a side wall of the mounting groove is provided with a depression for connecting the earphone in snap fit.

17. A head mounted display assembly, comprising an earphone and a head mounted display device,
    the head mounted display device comprises:
    a display body configured to display an image; and
    a sound transmission member connected to the display body, wherein the sound transmission member is provided with a sound amplification cavity, a mounting groove communicated with the sound amplification cavity, and a sound outlet hole, and the mounting groove is configured to accommodate the earphone, sound emitted by the earphone is transmitted outward through the sound outlet hole after amplified by the sound amplification cavity,
    a groove wall of the mounting groove is provided with a sound transmission hole which communicates with the sound amplification cavity,
    the sound amplification cavity comprises a sound transmission section and a sound amplification section communicated with the sound transmission section, the sound transmission section communicates with the sound transmission hole, and the sound amplification section communicates with the sound outlet hole, wherein a cross-sectional area of the sound amplification section gradually increases along a direction from the sound transmission section to the sound outlet hole, the sound transmission member comprises a seal provided in the sound transmission hole, the earphone is provided with a first magnetic member, the mounting groove is provided therein with a second magnetic member, the earphone is mounted in the mounting groove, and the first magnetic member and the second magnetic member attract each other.

\* \* \* \* \*